United States Patent
Desclos et al.

(10) Patent No.: US 10,033,097 B2
(45) Date of Patent: Jul. 24, 2018

(54) INTEGRATED ANTENNA BEAM STEERING SYSTEM

(71) Applicant: Ethertronics, Inc., San Diego, CA (US)

(72) Inventors: Laurent Desclos, San Diego, CA (US); Abhishek Singh, San Diego, CA (US); Jeffrey Shamblin, San Marcos, CA (US)

(73) Assignee: Ethertronics, Inc., San Diego, CA (US)

( * ) Notice: Subject to any disclaimer, the term of this patent is extended or adjusted under 35 U.S.C. 154(b) by 423 days.

(21) Appl. No.: 14/930,651

(22) Filed: Nov. 2, 2015

(65) Prior Publication Data

US 2016/0190685 A1 Jun. 30, 2016

Related U.S. Application Data

(63) Continuation-in-part of application No. 14/144,461, filed on Dec. 30, 2013, now Pat. No. 9,240,634, which is a continuation of application No. 13/726,477, filed on Dec. 24, 2012, now Pat. No. 8,648,755, application No. 14/930,651, which is a continuation-in-part of application No. 13/609,138, filed on Sep. 10, 2012, now Pat. No. 9,859,617, said application No. 13/726,477 is a continuation of application No. 13/029,564, filed on Feb. 17, 2011, now Pat. No. 8,362,962, which is a continuation of application No. 12/043,090, filed on Mar. 5, 2008, now Pat. No. 7,911,402.

(Continued)

(51) Int. Cl.
*H01Q 1/24* (2006.01)
*H01Q 3/22* (2006.01)
*H04W 16/28* (2009.01)
*H01Q 23/00* (2006.01)
*H01Q 3/24* (2006.01)
*H01Q 3/44* (2006.01)

(52) U.S. Cl.
CPC ............... *H01Q 3/22* (2013.01); *H01Q 1/243* (2013.01); *H01Q 3/247* (2013.01); *H01Q 3/44* (2013.01); *H01Q 23/00* (2013.01); *H04W 16/28* (2013.01)

(58) Field of Classification Search
CPC .......... H01Q 1/243; H01Q 23/00; H01Q 3/22; H01Q 3/44; H04W 16/28
See application file for complete search history.

(56) References Cited

U.S. PATENT DOCUMENTS 2,236,102 A 3/1941 Kolster
2,761,134 A 8/1956 Tewksbury et al.
(Continued)

*Primary Examiner* — Tho G Phan
(74) *Attorney, Agent, or Firm* — Dority & Manning, P.A.

(57) ABSTRACT

The disclosure concerns a beam steering antenna system that can be integrated into a portion of a mobile device, such as a ring conductor that encompasses the device or traverses a portion of the periphery of the mobile device. The single port antenna is capable of generating multiple radiation modes which possess different radiation pattern characteristics. An offset parasitic is implemented to couple to the main radiating element and alter the current distribution to affect a change in radiation mode. The coupling typically occurs at a coupling region designed into the conductive ring used as the antenna in a wireless device.

26 Claims, 20 Drawing Sheets

Related U.S. Application Data

(60) Provisional application No. 62/073,609, filed on Oct. 31, 2014, provisional application No. 61/532,822, filed on Sep. 9, 2011.

(56) References Cited

U.S. PATENT DOCUMENTS

| | | | |
|---|---|---|---|
| 3,971,031 A | 7/1976 | Burke | |
| 5,235,343 A | 8/1993 | Audren et al. | |
| 5,568,155 A | 10/1996 | Tsunekawa et al. | |
| 5,598,169 A | 1/1997 | Drawbeck et al. | |
| 5,777,581 A | 7/1998 | Lilly et al. | |
| 5,874,919 A | 2/1999 | Rawnick et al. | |
| 5,943,016 A | 8/1999 | Snyder et al. | |
| 6,198,943 B1 * | 3/2001 | Sadler | H01Q 1/243 343/702 |
| 6,326,921 B1 | 12/2001 | Egorov et al. | |
| 6,765,536 B2 | 7/2004 | Phillips et al. | |
| 6,876,329 B2 * | 4/2005 | Milosavljevic | H01Q 1/243 343/700 MS |
| 6,903,686 B2 | 6/2005 | Vance et al. | |
| 7,068,234 B2 | 6/2006 | Sievenpiper | |
| 7,081,854 B2 | 7/2006 | Ying et al. | |
| 7,132,989 B1 | 11/2006 | Poilasne | |
| 7,180,464 B2 | 2/2007 | Chiang et al. | |
| 7,265,720 B1 * | 9/2007 | Ponce De Leon | H01Q 1/243 343/700 MS |
| 7,330,156 B2 | 2/2008 | Arkko et al. | |
| 7,528,783 B2 * | 5/2009 | Takagi | H01Q 1/243 343/702 |
| 7,728,785 B2 * | 6/2010 | Ozden | H01Q 1/243 343/866 |
| 7,830,320 B2 | 11/2010 | Shanmblin et al. | |
| 7,903,034 B2 | 3/2011 | Anguera et al. | |
| 7,911,402 B2 | 3/2011 | Rowson et al. | |
| 9,444,130 B2 * | 9/2016 | Bevelacqua | H01Q 1/243 |
| 9,711,858 B1 * | 7/2017 | Lee | H01Q 9/06 |
| 2004/0027286 A1 | 2/2004 | Poilasne et al. | |
| 2004/0227667 A1 | 11/2004 | Sievenpiper | |
| 2005/0192727 A1 | 9/2005 | Shostak et al. | |
| 2005/0275596 A1 | 12/2005 | Harano | |
| 2005/0285541 A1 | 12/2005 | Lechevalier | |
| 2006/0220966 A1 | 10/2006 | Sarychev et al. | |
| 2007/0069958 A1 | 3/2007 | Ozkar | |
| 2007/0176824 A1 | 8/2007 | Stumbo | |
| 2008/0001829 A1 | 1/2008 | Rahola et al. | |

\* cited by examiner

INTEGRATED ANTENNA BEAM STEERING SYSTEM

CROSS REFERENCE TO RELATED APPLICATIONS

This application is a continuation in part (CIP) of commonly owned U.S. application Ser. No. 13/609,138, filed Sep. 10, 2012, and titled "ACTIVE ANTENNA STRUCTURE MAXIMIZING APERTURE AND ANCHORING RF BEHAVIOR", which claims benefit of priority with U.S. Provisional Ser. No. 61/532,822, filed Sep. 9, 2011 and having the same title;

is a continuation in part (CIP) of U.S. Ser. No. 14/144,461, filed Dec. 30, 2013, titled "ANTENNA AND METHOD FOR STEERING ANTENNA BEAM DIRECTION"; which is a continuation (CON) of U.S. Ser. No. 13/726,477, filed Dec. 24, 2012, having the same title, now U.S. Pat. No. 8,648,755 issued Feb. 11, 2014; which is a continuation (CON) of U.S. Ser. No. 13/029,564, filed Feb. 17, 2011, having the same title, now U.S. Pat. No. 8,362,962, issued Jan. 29, 2013; which is a continuation (CON) of U.S. Ser. No. 12/043,090, filed Mar. 5, 2008, having the same title, now U.S. Pat. No. 7,911,402, issued Mar. 22, 2011; and claims benefit of priority with U.S. Provisional Ser. No. 62/073,609, filed Oct. 31, 2014, titled "INTEGRATED ANTENNA BEAM STEERING SYSTEM";

the contents of each of which are hereby incorporated by reference.

BACKGROUND OF THE INVENTION

Field of the Invention

This invention relates to antenna systems integrated into wireless mobile devices, and in particular, to antenna systems capable of dynamically changing radiation modes which result in variable radiation patterns.

Description of the Related Art

There is a current need for improved connectivity at cellular and data transmission bands for mobile devices to accommodate the increasing demand for data rates for mobile wireless systems. Improved antenna performance, such as increased efficiency or optimization of the radiation pattern, will translate into increased data rates. A method for increasing antenna system performance in wireless devices is to increase antenna volume; unfortunately, the trend in mobile devices is to decrease overall product size along with increasing the number of functions required to be integrated into the platform. Improving the directive properties or beam pointing attributes of an antenna will result in improved communication link performance due to the increase in antenna gain in the desired direction of propagation.

To complicate the antenna design process in mobile devices, antenna performance needs to be optimized and characterized for several use cases such as against the user's head, in hand, and against the body. These multiple use cases result in a variation in antenna total efficiency as well as a variation in radiation pattern characteristics (pattern shape and polarization properties).

Beam steering techniques have been implemented for many years on the base station side of the cellular communication link, with the beam steering providing improvements in radiated field strength on the transmit function and RSSI on the receive function. Inherent improvements in interference can also realized by beam forming and steering techniques by better spatial distribution of the radiated signal. Beam steering on the base station typically takes the form of a traditional array where multiple antenna elements are connected to a feed network and amplitude and phase at each element is controlled to provide the preferred antenna beamwidth and directivity. To date, beam steering techniques have not been implemented in mobile devices due to limitations in volume available for multiple antenna elements that can be arrayed to provide a more directive radiation pattern. Another issue restricting the implementation of beam steering in mobile devices is the potential for a two element array providing little or no benefit when one of the two elements is covered by a user's hand or otherwise degraded by body loading.

A beam steering system which utilizes a single antenna with a single feed port is capable of generating multiple radiation patterns is described in U.S. Pat. No. 7,911,402, entitled "ANTENNA AND METHOD FOR STEERING ANTENNA BEAM DIRECTION," issued on Mar. 22, 2011, the contents of which are hereby incorporated by reference. This technique lends itself well to small mobile devices which are volume constrained. This technique relies on an offset parasitic element to alter the current distribution on the radiating element and a second parasitic element more closely coupled to the radiator to adjust the frequency response of the antenna. This beam steering technique is implemented on a planar structure which is elevated above a ground plane, making this a good option for an internal antenna in a cell phone. Implementing this approach on both the main and secondary antennas in a MIMO antenna system provides multiple radiation patterns to select from and also provides for multiple radiation patterns from the single antenna that is not affected during a situation where hand loading or body loading degrades one of the two antennas in a mobile wireless device. This antenna topology does not lend itself to implementation in handsets which have a metal ring wrapped around the circumference of the device.

Another antenna technique involves the use of coupling gaps in a ring type structure to allow for use of the ring structure encompassing a mobile device to be used as an antenna, and is further described in U.S. application Ser. No. 13/609,138, entitled "ACTIVE ANTENNA STRUCTURE MAXIMIZING APERTURE AND ANCHORING RF BEHAVIOR" filed on Sep. 10, 2012, the contents of which are hereby incorporated by reference. The coupling regions designed into the gaps assist in minimizing the de-tuning effects in the ring to hand or body loading. The overall structure can be considered as a capacitively loaded inductive loop. The capacitance is formed by the coupling between the two parallel conductors with the inductive loop formed by connecting the second element to ground. The length of the overlap region between the two conductors along with the separation between conductors is used to adjust the resonant frequency of the antenna. A wider bandwidth can be obtained by increasing the separation between the conductors, with an increase in overlap region used to compensate for the frequency shift that results from the increased separation.

An advantage of this type of antenna structure is the method in which the antenna is fed or excited. The impedance matching section is almost independent from the resonant portion of the antenna. This leaves great flexibility for reduced space integration. At resonance a cylindrical current going back and forth around the loop is formed. This generates a magnetic field along the axis of the loop which is the main mechanism of radiation. The electrical field remains highly confined between the two elements. This reduces the interaction with surrounding metallic objects and is essential in obtaining high isolation.

DESCRIPTION OF EMBODIMENTS

Figure 1:
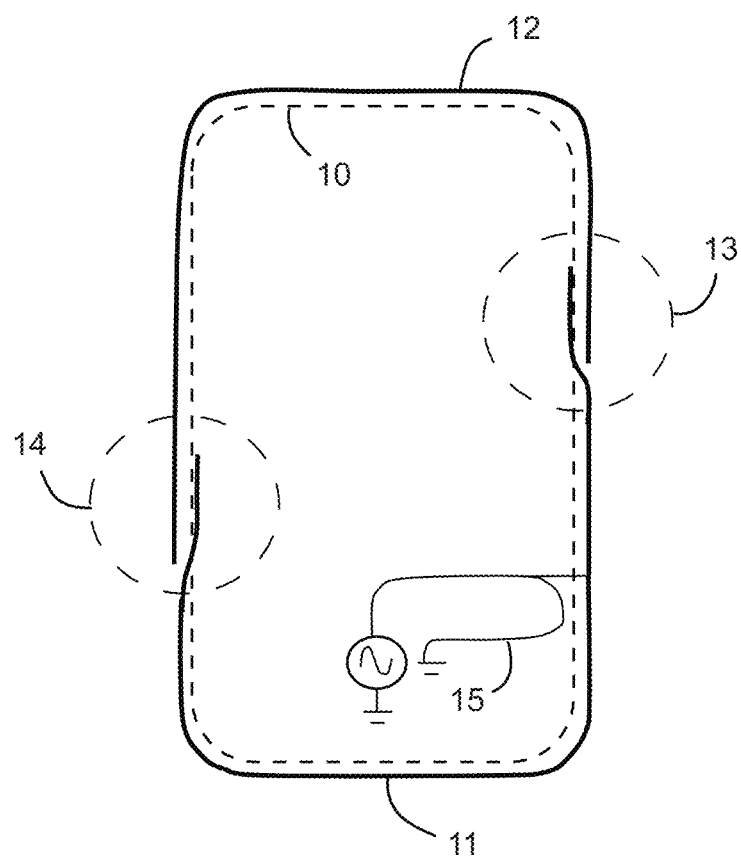
FIG. 1 shows an antenna arranged to extend about a periphery of a wireless communication device, the antenna includes a first conductor and a second conductor, wherein coupling regions are formed between overlapping terminal ends of the first and second conductors.

Implementing a beam steering function into an antenna designed into a ring type conductor encompassing a mobile wireless device will provide for improved communication link performance between the mobile device and the base terminal as well as benefits in terms of improved capacity for the cellular network that the mobile device with beam steering antenna is implemented on.

Accordingly, it is an object of the present invention to solve these and other problems in the art by providing a beam steering antenna system with multiple radiation modes that can be integrated into handset and other mobile device configurations that utilize metal ring type structures in the industrial design. Improvements to the communication link will result from a proper selection of the appropriate radiation mode for the multi-path environment for a specific timeframe and location.

In accordance with one embodiment, three conductors (first conductor, second conductor, third conductor) are each positioned along the perimeter (or "periphery") of a communication device to form an antenna system. One end of the first conductor is connected to a transceiver, with the transceiver providing an RF signal to the first conductor. A portion of the second conductor is positioned in proximity to a portion of the first conductor to form a first coupling region disposed therebetween. The characteristics of this first coupling region such as distance between conductors and length or amount of overlap of the conductors used to form this first coupling region are adjusted to control the resonant frequency and/or impedance properties of the antenna. The third conductor is positioned to form a second coupling region with the antenna formed by the first and second conductor, with this third conductor used to alter the current mode on the antenna. By altering the current mode on this antenna the radiation pattern can be altered or varied. The third conductor can alter the current mode on the antenna formed by the first two conductors by short circuiting one end of the third conductor to ground or open circuit the third conductor. Transitioning from an open circuit condition to a short circuit condition on this third conductor will alter the current mode on the first and second conductors, resulting in an altering of the radiation pattern associated with the antenna. This third conductor is also referred to herein as an "offset parasitic element". A switch can be used to connect or disconnect one end of the third conductor to ground.

In another embodiment, three conductors are positioned along the perimeter of a communication device to form an antenna system. One end of a first conductor of the three conductors is connected to a transceiver, with the transceiver providing an RF signal to the first conductor. A portion of the second conductor is positioned in proximity to a portion of the first conductor to form a first coupling region disposed therebetween. The characteristics of this first coupling region such as distance between conductors and length of overlap of the conductors forming this coupling region are adjusted to control the resonant frequency and/or impedance properties of the antenna. In this regard, the space between the first and second conductors can be increased or decreased, and the length of overlapping portions of the first and second conductors can similarly be increased or decreased. The third conductor is positioned to form a second coupling region with the antenna formed by the first and second conductor, with this third conductor used to alter the current mode on the antenna. A multi-port switch can be connected to one end of the third conductor to provide additional impedances that can be connected between this end of the third conductor and the common ground. The impedance loads used to connect between the switch ports and the common ground can be chosen to provide additional radiation patterns from the single antenna formed by the first and second conductors.

In another embodiment, a tunable component such as a tunable capacitor can be implemented in a matching circuit at the feed point located at the junction of the first conductor and the transceiver port. The tunable component is configured to adjust the frequency response and/or impedance of the antenna system as the radiation modes are variably implemented. This tuning function is important to correct for frequency shifts that can be generated when the offset parasitic element used to alter current modes on the antenna elements switches or changes states.

In another embodiment, a fourth conductor can be implemented to form an additional coupling region such that two coupling regions are formed using three conductors positioned around the periphery of a device to form an antenna. The two coupling regions provide additional design flexibility in setting up additional frequency resonances from the antenna system. The fourth conductor can be used to couple to one or multiple regions of the three conductor antenna system to generate multiple radiation patterns by applying multiple impedance loads to this fourth conductor between one end of the conductor and the common ground.

Nearly any number of conductors, coupling regions, and tunable elements can be implemented and arranged to form an active antenna. The illustrated embodiments are merely provided to enable those having skill in the art to make and use the invention. Those with skill in the art will readily appreciate the various alternative configurations that can be implemented by rearranging the various components described herein.

In another embodiment of the invention, a three conductor antenna system as described above can be implemented around the perimeter of a communication device, and constrained to one half of the perimeter. A second antenna system of the same or similar design can be implemented around the perimeter of said communication device, with this second antenna system constrained to the half of the perimeter not occupied by the first antenna system. This two-antenna system, with each antenna capable of beam steering, can be used for Multiple Input Multiple Output (MIMO) operation. Alternatively, the two-antenna systems can be used to implement a main antenna for 2G/3G cellular applications and the second antenna system used as a diversity antenna for 3G frequency bands.

Other aspects and features of the present invention will become apparent to those having ordinary skill in the art upon review of the description of specific embodiments of the invention in conjunction with the accompanying figures. It is to be understood that both the foregoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

Now turning to the drawings, FIG. 1 illustrates an improved method of integrating an antenna external to a mobile device. An isolated magnetic dipole (IMD) antenna is formed which contains two coupled conductor sections 11; 12, respectively; the first conductor 11 is used to form a low frequency resonance and the second conductor 12 is used to form a high frequency resonance. A tuning loop 15 is integrated internal to the mobile device, with the tuning loop coupled to the IMD antenna at the feed junction. The loop is used to feed the IMD antenna and can be adjusted to impedance match the IMD antenna to the transceiver. The internal loop is dimensioned such that the loop radiates or receives RF signals. The resonant frequency of the loop is adjusted such that the resonance is offset from the resonance of the external IMD antenna. An antenna encompassing the periphery of a device with integrated coupling regions for frequency control and to minimize effects of hand loading on antenna performance is shown.

Figure 2A:
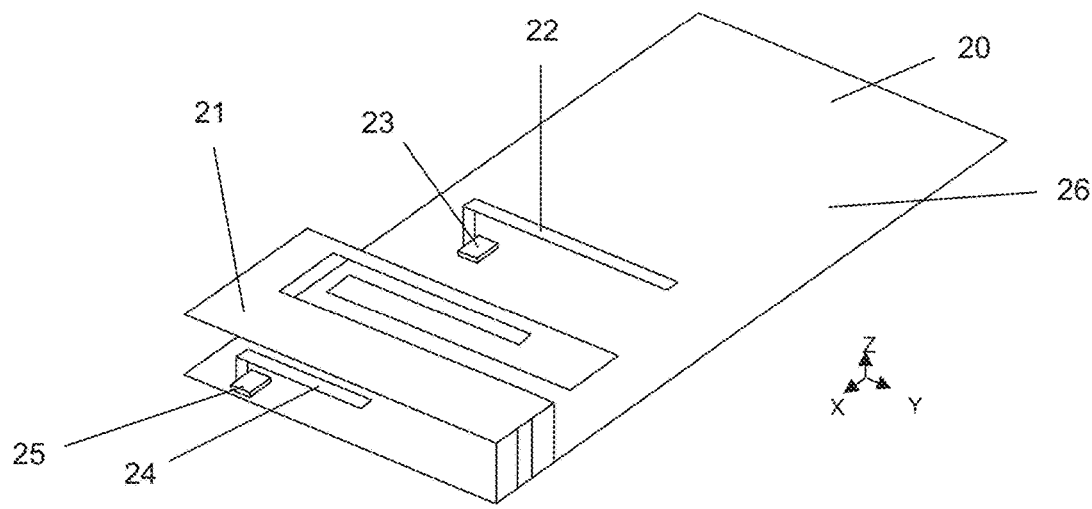
FIG. 2A show an active beam steering antenna in accordance with one embodiment.
Figure 2B:
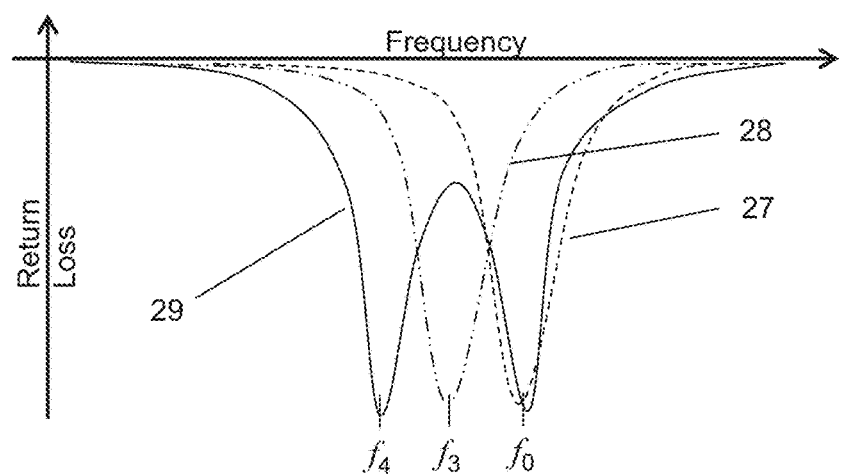
FIG. 2B shows a plot of the frequency responses of the antenna as the radiation mode is varied about the active beam steering antenna.

FIG. 2A illustrates an active beam steering antenna including a radiating element 21 positioned above a ground plane (circuit board) 26 forming an antenna volume therebetween, a first parasitic element 24 and a first active tuning element 25 coupled therewith is positioned within the antenna volume, and a second parasitic element 22 and second active tuning element 23 coupled therewith is positioned outside of the antenna volume and adjacent to the radiating element. In FIG. 2B, a single resonance 27 having frequency f0 is created when both parasitic elements 22; 24 are NOT shorted to ground. Dual resonances at f0 and f4, respectively, are created when a parasitic element 22 is shorted to ground. Parasitic element 24 is then tuned to shift the frequency of the antenna f0 into the band of interest. The parasitic and active tuning elements are tuned either by varactor diodes or variable elements that are voltage driven. Thus, a modal antenna capable of generating multiple radiation patterns from a single port antenna is shown.

Figure 2C:
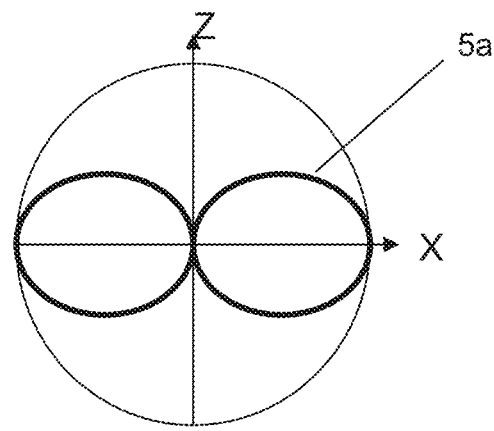
FIG. 2C shows a first radiation pattern associated with the active beam steering antenna.

FIG. 2C shows a first radiation pattern associated with the active beam steering antenna.

Figure 2D:
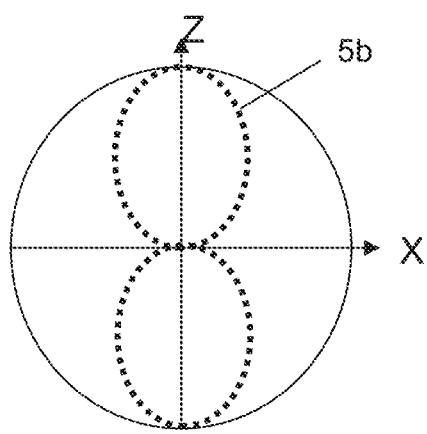
FIG. 2D shows a second radiation pattern associated with the active beam steering antenna.

FIG. 2D shows a second radiation pattern associated with the active beam steering antenna.

The active beam steering antenna of FIGS. 2(A-D) is further described in commonly owned U.S. Pat. No. 7,911,402, issued Mar. 22, 2011, the contents of which is hereby incorporated by reference.

FIGS. 3(A-B) illustrate an improvement in bandwidth achieved when an additional conductor is coupled to an external IMD antenna. An additional resonance at the upper frequency band can be generated by coupling an additional conductor to one of the conductors in the IMD antenna. The coupling of the additional conductor effectuates a change in frequency response of the antenna. Thus, an additional conductor can be applied to generate another coupling region for frequency control. A tunable component can be added to develop an embodiment which tunes the frequency response.

Figure 3A:
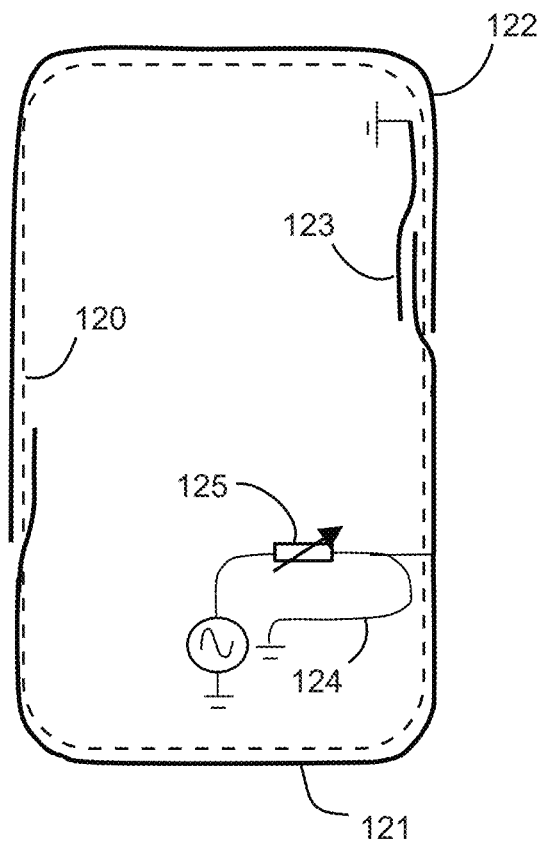
FIG. 3A shows an antenna with an offset parasitic element used to vary a frequency response of the antenna.

As shown in FIG. 3A, the antenna includes a first conductor 121 and a second conductor 122 collectively extending about a periphery 120 of the wireless communication device. An offset parasitic element 123 is positioned near a first coupling region (region of overlap of the first and second conductors) and connected to ground. An active tunable component 125 and a tuning loop 124 are each coupled to a feed junction of the antenna.

Figure 3B:
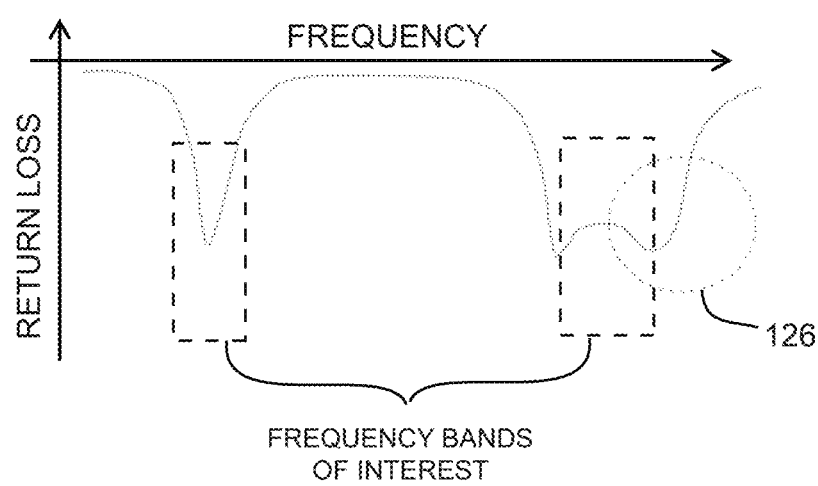
FIG. 3B shows a plot of antenna frequency response with respect to the antenna in each of the antenna modes associated therewith.

FIG. 3B shows the frequency response of the antenna of FIG. 3A, wherein the offset parasitic element forms a split resonance in the high band.

Figure 4A:
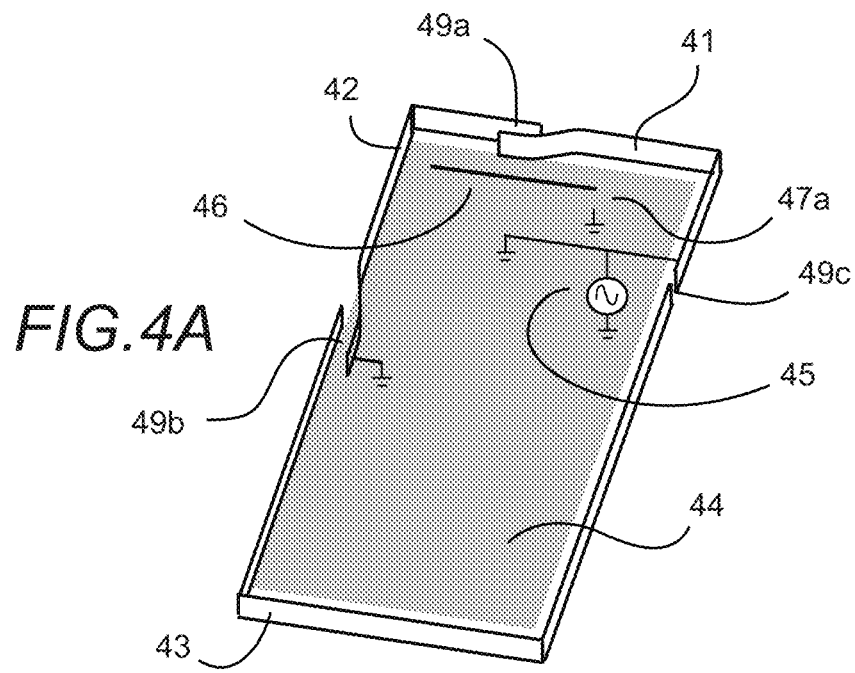
FIG. 4A shows an active beam steering antenna configured about a periphery of a wireless communication device, the antenna being configured in a first mode, wherein the offset parasitic element is configured in an open circuit configuration when in the first mode.
Figure 4B:
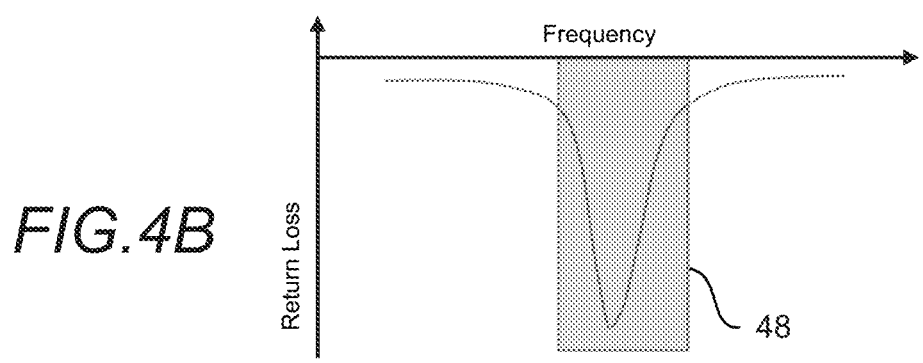
FIG. 4B shows a plot of the frequency response of the antenna of FIG. 4A when in the first mode.
Figure 4C:
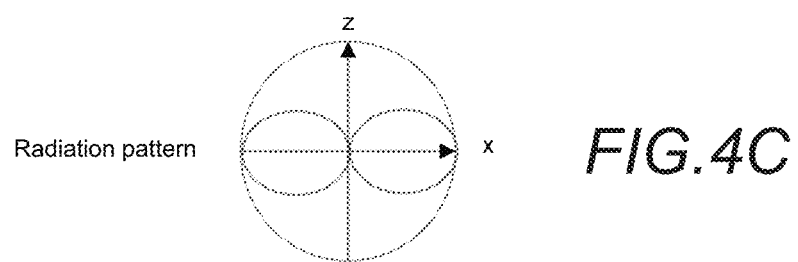
FIG. 4C shows a radiation pattern of the antenna of FIG. 4A when in the first mode.

FIG. 4 illustrates an antenna system comprised of four conductors, three of which are positioned around the periphery of a ground plane associated with a wireless communication device. A first conductor 41 is fed with a signal source and the first end of a second conductor 42 is positioned such that a region of the second conductor forms a first coupling region 49a with a portion of the first conductor. The second end of the second conductor is grounded to the ground plane 44. A third conductor 43 is positioned to form a second coupling region 49b with the second conductor at a region of overlap therebetween, with this third conductor traversing the remainder of the perimeter of the ground plane. A fourth conductor 46 provides the offset parasitic and is positioned in proximity to the first coupling region formed by the first and second conductors. This offset parasitic element 46 is not ground to the ground plane or connected to any other features in this antenna system, thus the antenna is said to be configured in a "first mode". In FIG. 4B, a frequency response of the antenna is shown along with a frequency band of interest 48. In FIG. 4C, a two dimensional representation of the radiation pattern of the antenna formed by these four conductors at the resonant frequency.

FIG. 5 illustrates the antenna system described in FIG. 4 with the exception that the offset parasitic is grounded to the ground plane and the antenna is said to be in a "second mode". The antenna includes a first conductor 41, and second conductor 42 overlapping at first coupling region 49a. A third conductor 43 overlaps with the second conductor 42 at a second coupling region 49b. The first through third conductors expand about the perimeter of a circuit board 44. A feed and tuning circuit 45 is coupled to the first conductor. Offset parasitic element 46 is shown with a connection 47b coupling to ground.

Figure 5A:
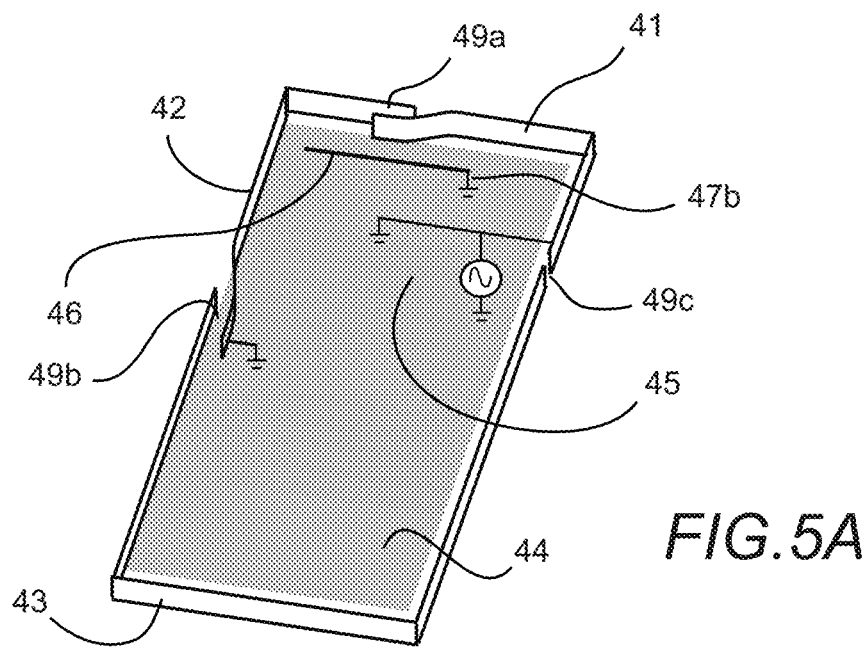
FIG. 5A shows the active beam steering antenna of FIG. 4A configured being configured in a second mode, wherein the offset parasitic element is configured in a short circuit configuration when in the second mode.
Figure 5B:
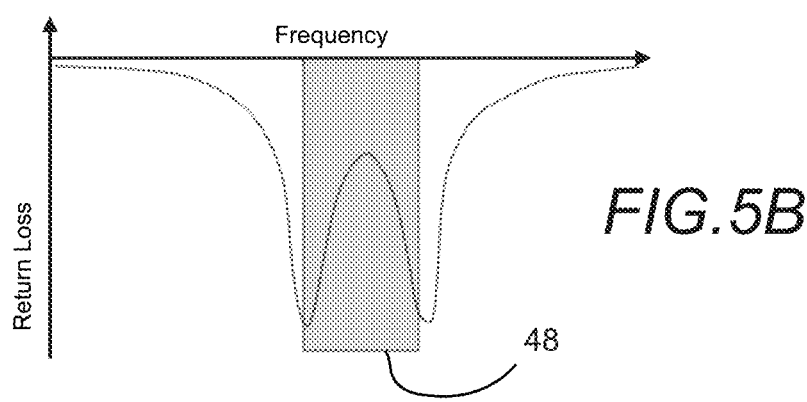
FIG. 5B shows a plot of the frequency response of the antenna of FIG. 5A when in the second mode.

FIG. 5B shows a split resonant frequency response associated with the antenna system of FIG. 5A.

Figure 5C:
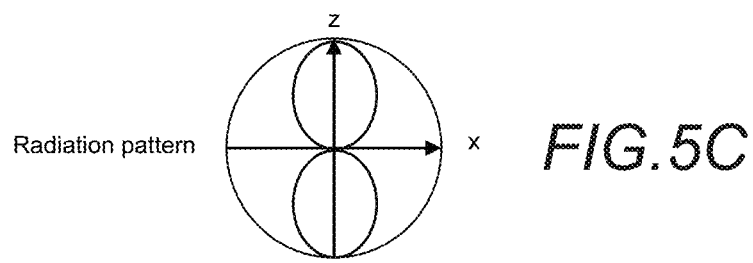
FIG. 5C shows a radiation pattern of the antenna of FIG. 5A when in the second mode.

FIG. 5C shows a two dimensional representation of the radiation pattern of the antenna formed by these four conductors at the resonant frequency. The radiation pattern has rotated with respect to the radiation pattern shown in FIG. 4C, with this pattern rotation due to the connecting of the offset parasitic to the ground plane.

Figure 6A:
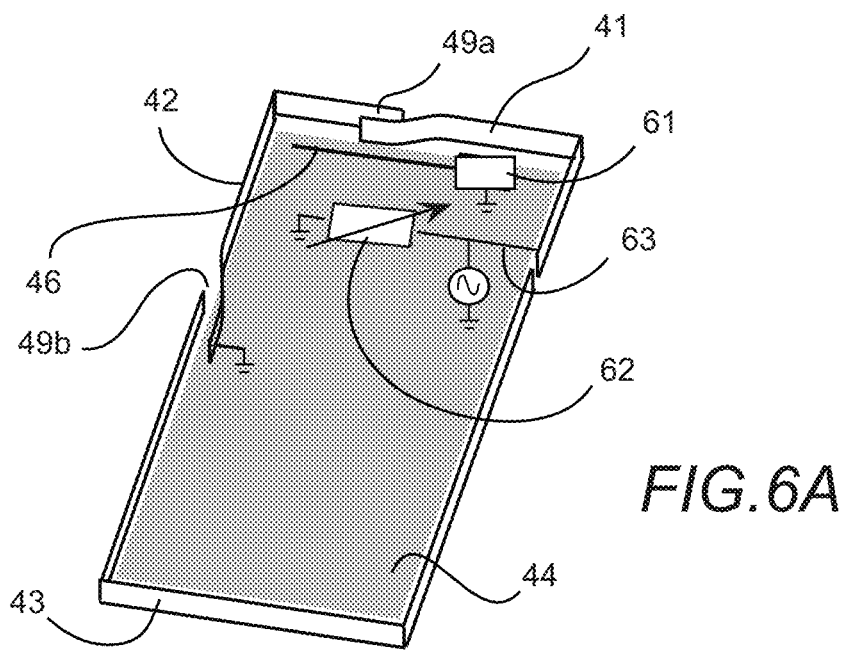
FIG. 6A shows the antenna of FIGS. 4A and 5A, with a tunable component being coupled to a feed junction of the antenna.

FIG. 6 illustrates the antenna system described in FIG. 4 with the exceptions of one port of a switch 61 connected to one end of the offset parasitic 46, with the second port of the switch 61 connected to the ground plane 44. A second exception is that a tunable component 62 is connected in shunt to the signal source feeding the antenna at the junction 63 with the first conductor 41. Otherwise, the components are similar to that of the antenna in FIG. 4A. Thus, here a tunable component is used to shift the antenna frequency response lower to provide a good return loss in the frequency band of interest.

Figure 6B:
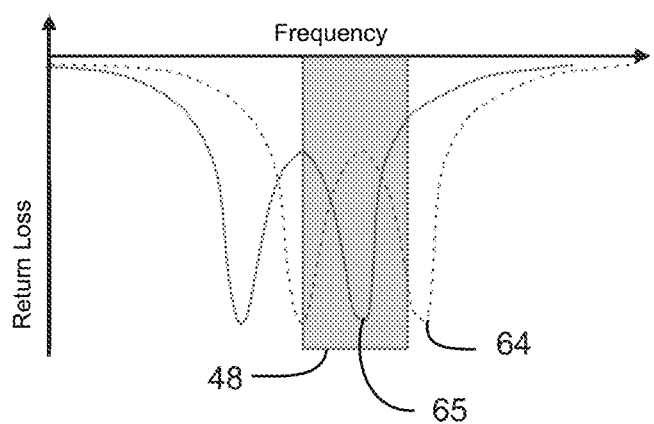
FIG. 6B shows a plot of the frequency response of the antenna of FIG. 6A, as the offset parasitic element is switched between configuration modes (open circuit, short circuit) the tunable component is reconfigured to shift the frequency response of the antenna into the frequency band of interest.

FIG. 6B shows the frequency response of the antenna system before and after tuning using the tunable component. A frequency band of interest 48 is shown, along with the radiation pattern of the antenna in the first mode 64 and that of the antenna in the second mode 65.

Figure 6C:
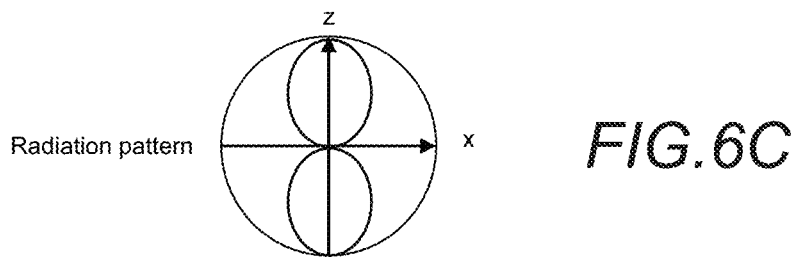
FIG. 6C shows a radiation pattern of the antenna of FIG. 6A in one mode.

As shown in FIG. 6C, the radiation pattern is the same as shown in FIG. 5.

Figure 7A:
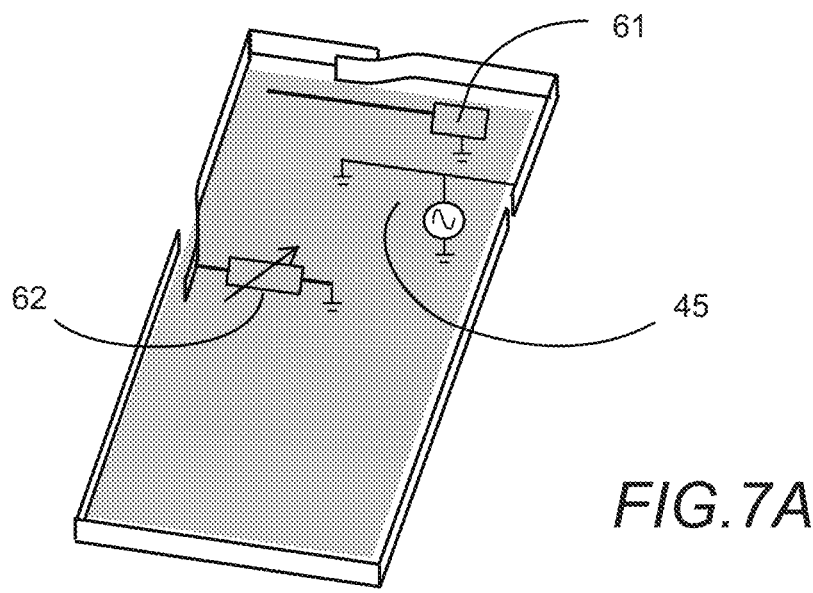
FIG. 7A shows an antenna similar to that shown in FIG. 6A, however, the tunable component is shown coupled to the second conductor for shifting a frequency response of the antenna.

FIG. 7A illustrates the antenna system described in FIG. 6 with the exception that the tunable component used in shunt with the signal source feeding the antenna has been moved wherein one end of the tunable component 62 is connected to the second end of the second conductor, with the other port of the tunable component connected to the ground plane. The tuning circuit and feed 45 are coupled to the first conductor. Switch 61 is shown for coupling and decoupling the offset parasitic element to ground. Accordingly, an alternative method is shown for shifting the frequency response lower to provide a good return loss in the frequency band of interest.

Figure 7B:
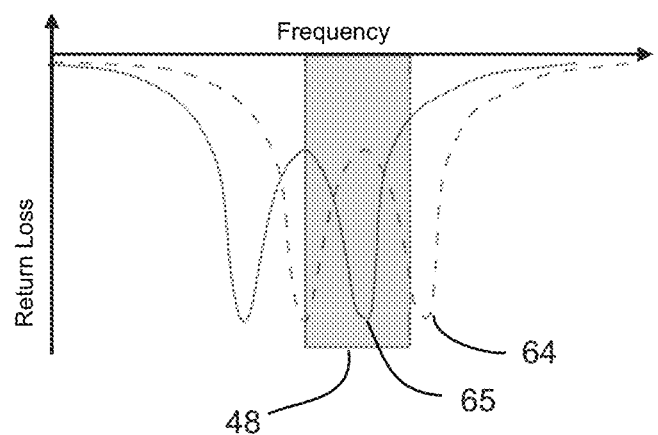
FIG. 7B shows a plot of the frequency response of the antenna of FIG. 7A, as the offset parasitic element is switched between configuration modes (open circuit, short circuit) the tunable component is reconfigured to shift the frequency response of the antenna into the frequency band of interest.
Figure 7C:
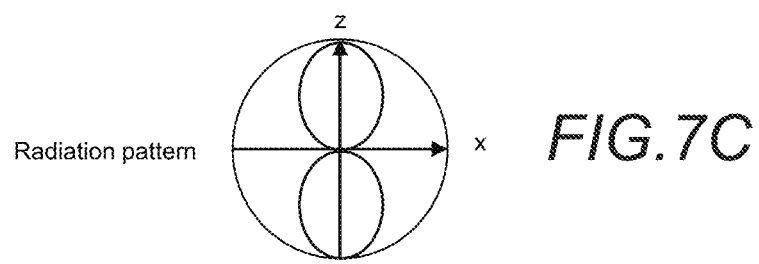
FIG. 7C shows a radiation pattern of the antenna of FIG. 6A in one mode.

FIG. 7B shows the frequency response of the antenna system of FIG. 7A before and after tuning using the tunable component 62. In FIG. 7C the radiation pattern is the same as shown in FIG. 6C.

FIGS. 8(A-B) illustrate two methods of beam steering at the low frequency resonance formed by the antenna system.

Figure 8A:
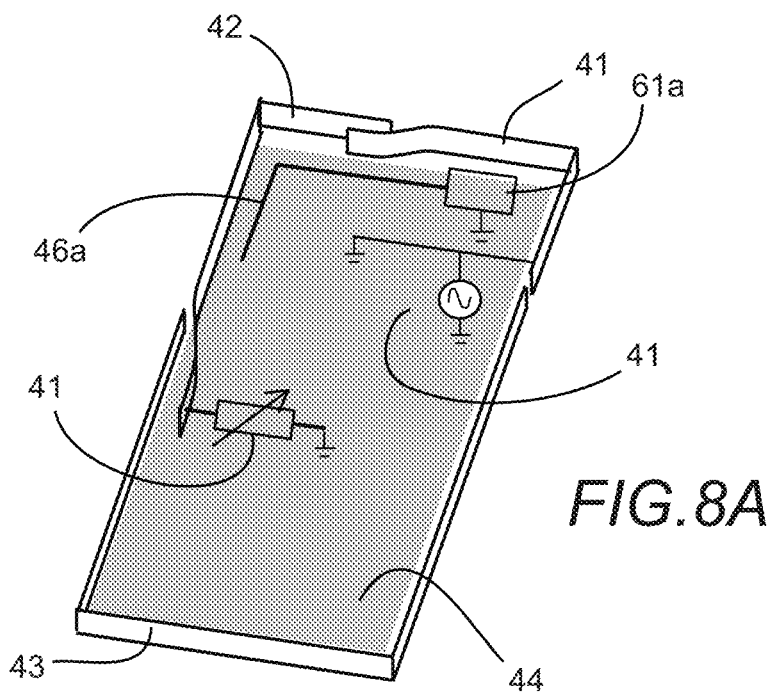
FIGS. 8A-8B each shows an active beam steering antenna configured to adjust low band resonances of the antenna.

The first method, referring to the antenna of FIG. 8A, shows an extended offset parasitic 46a in an "L" shape, which allows for a longer coupling region between the parasitic element and the first and second conductors 41; 42, respectively. The offset parasitic element is coupled to a switch 61a for connecting and disconnecting the parasitic element to ground 44. The tuning and feed circuit 45 is coupled to the first conductor 41. The tunable component 62 is shown coupled to the second conductor 42. A third conductor 43, along with the first and second conductors are configured to extend about a perimeter of the device or circuit board.

Figure 8B:
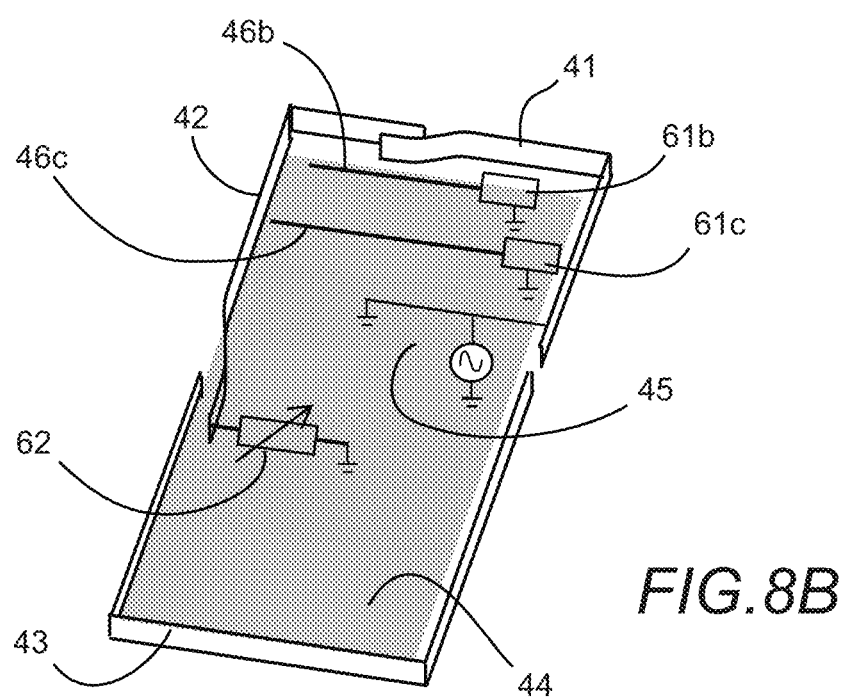

The second method, now referring to FIG. 8B, shows a pair of offset parasitic elements 46b; 46c, one designated for "high frequency bands" and the other designated "low frequency bands". These two offset parasitic elements can be optimized for low band and high band operation. Each is coupled to a respective switch 61*b*; 61*c*. the remainder of the antenna is similar in configuration to that shown in FIG. 8A.

Figure 9:
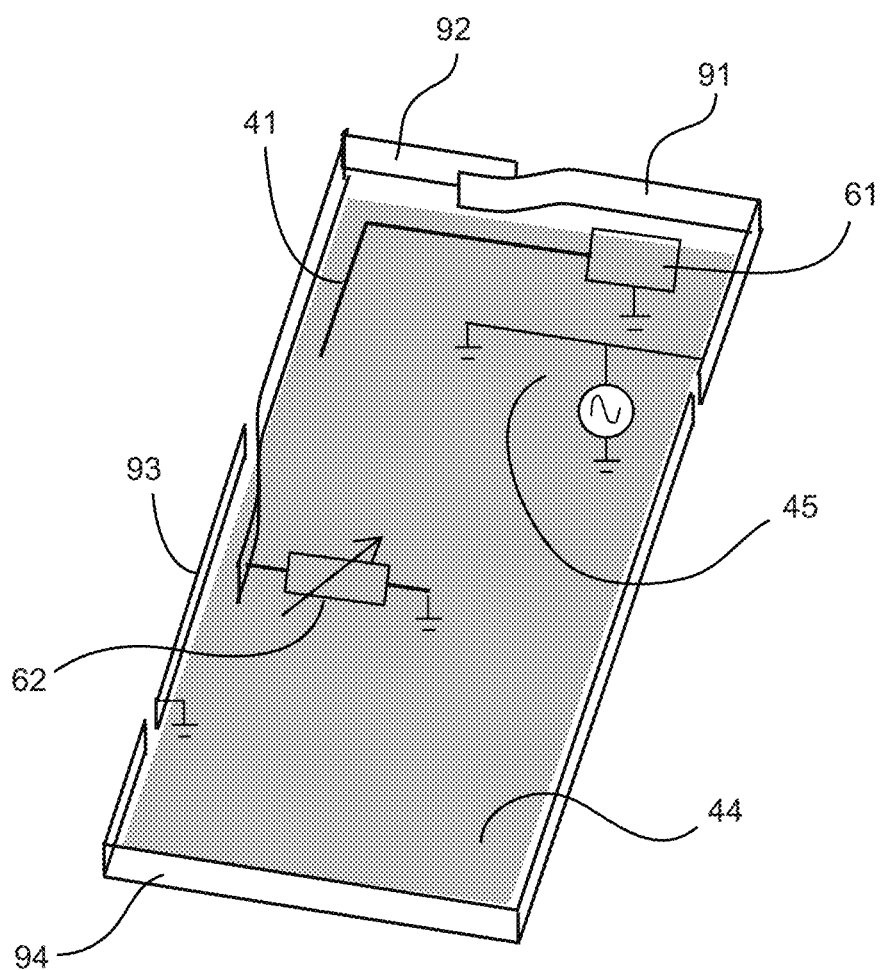
FIG. 9 shows an alternative beam steering antenna configured for varying the low frequency resonance of the antenna system.

FIG. 9 illustrates an alternate scheme for beam steering (or "null steering") at the low frequency resonance of the antenna system. This method is similar to the first method illustrated in FIG. 8 with the exception that the third conductor shown in FIG. 8 has been separated into two conductors, a third conductor 93 and fourth conductor 94 here in FIG. 9. One end of the third conductor is positioned in proximity to a portion of the second conductor 92 and forms a second coupling region with this second conductor. The opposing end of the third conductor is grounded to the ground plane 44. The fourth conductor is positioned to traverse the remainder of the periphery of the ground plane. The first coupling region is formed between the overlapping first conductor 91 and second conductor 92. A tuning and feed circuit 45 is coupled to the first conductor 91. The offset parasitic element 46 is coupled to a switch 61 for connecting and disconnecting to the ground plane 44.

Figure 10:
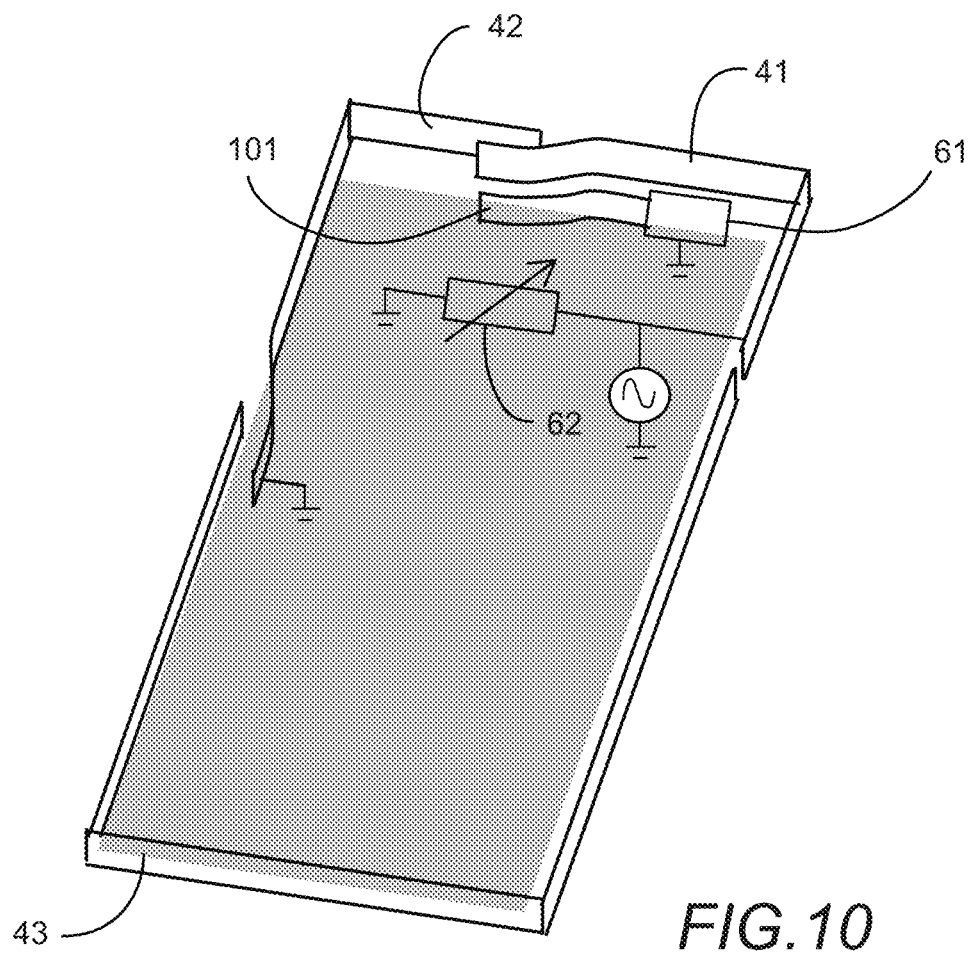
FIG. 10 shows an antenna system wherein a planar parasitic conductor is implemented as the offset parasitic element to generate a beam steering function.

FIG. 10 illustrates an antenna system wherein a planar conductor is implemented as an offset parasitic element 101 to generate a beam steering function. Otherwise, the antenna system of FIG. 10 is similar to the embodiment as illustrated in FIG. 6.

Figure 11:
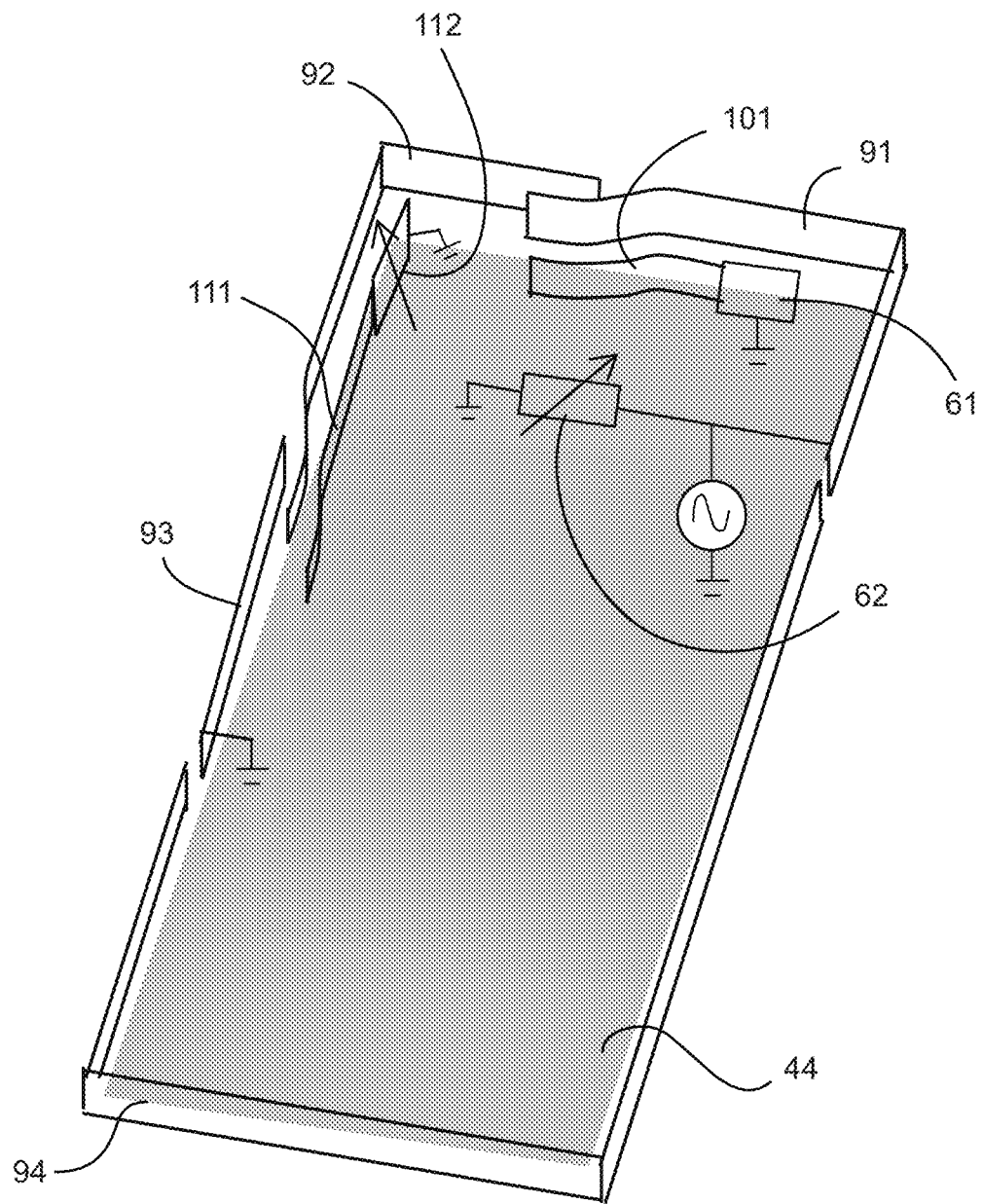
FIG. 11 shows an antenna system wherein two planar conductors are implemented as offset parasitic elements to generate a beam steering function in the antenna at each of a low frequency band and a high frequency band.

FIG. 11 illustrates an antenna system wherein two planar conductors 101; 111 are implemented as offset parasitic elements to generate a beam steering function at a low frequency band and a high frequency band. The first offset parasitic element 101 is coupled to a first switch 61 which is further coupled to ground. The second offset parasitic element 111 is coupled to a second switch 112 which is further coupled to ground. The first and second parasitic elements are configured to produce low band and high band resonances, with the first offset parasitic element as shown being configured for the high band resonance and the second offset parasitic element as shown being configured for the low band resonance.

Figure 12A:
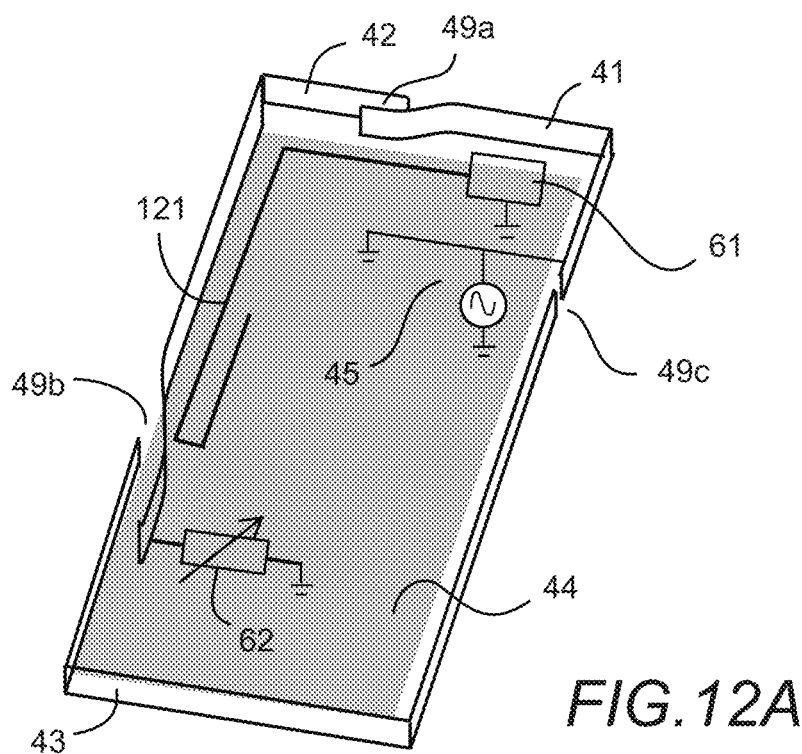
FIG. 12A shows an active beam steering antenna configured about a periphery of a wireless communication device.

FIGS. 12(A-B) illustrate a scheme for beam steering at both a low frequency and a high frequency by implementing an offset parasitic element which has a section of conductor which is shaped to bend back to increase the physical length of conductor within a confined area. In FIG. 12A, the single offset parasitic element 121 couples to two coupling regions formed by the first, second, and third conductors 41; 42; 43, respectively, that are used to form an antenna. Otherwise, the antenna is structured and configured similar to that of FIG. 9.

Figure 12B:
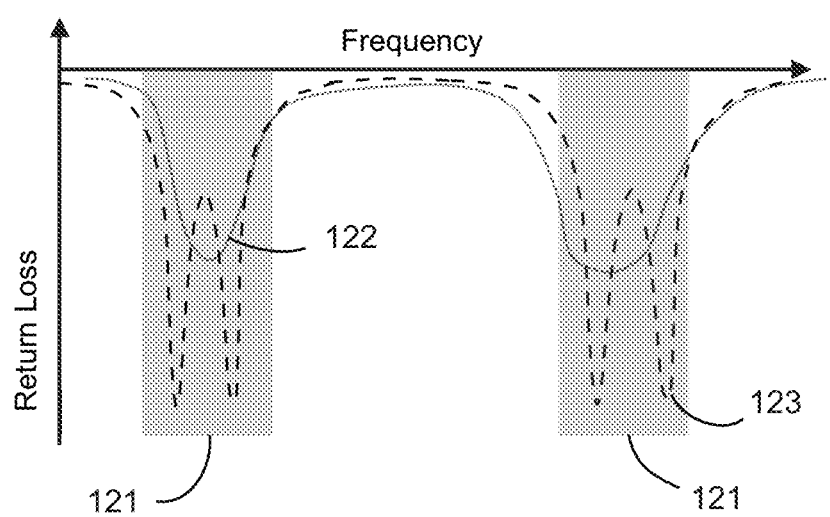
FIG. 12B shows a plot of the frequency response of the antenna of FIG. 12A in each of a first mode and a second mode.

FIG. 12B shows a frequency response of the antenna of FIG. 12A, wherein both the low and high frequency band resonances are shown for both the open circuited 122 and short circuited 123 states for the offset parasitic. Frequency bands of interest 121 in the low band and high bands are shown.

Figure 13:
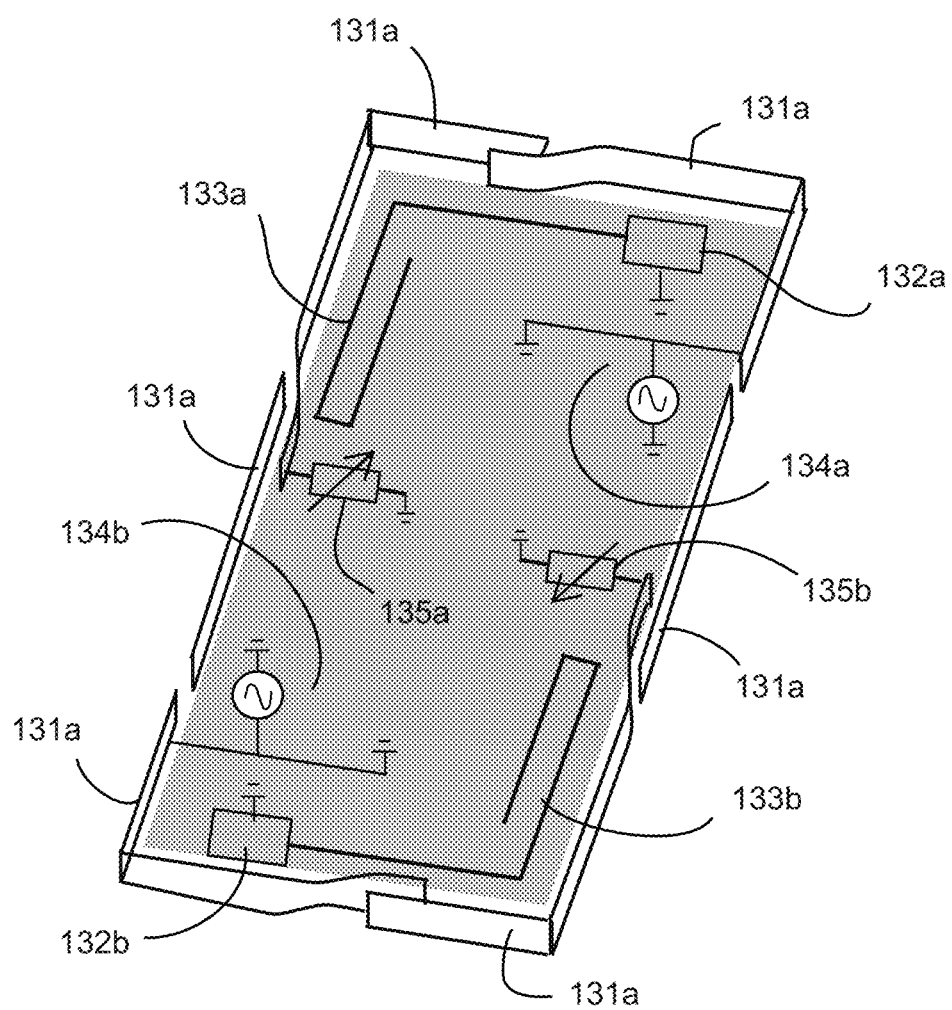
FIG. 13 illustrates a MIMO beam steering antenna system wherein the antenna system described in FIG. 12 is duplicated such that two of these antenna systems are co-located within the same device.

FIG. 13 illustrates a MIMO beam steering antenna system wherein the antenna system described in FIG. 12 is duplicated such that two of these antenna systems are co-located within the same device, the device in this case shown being a common ground plane.

Figure 14:
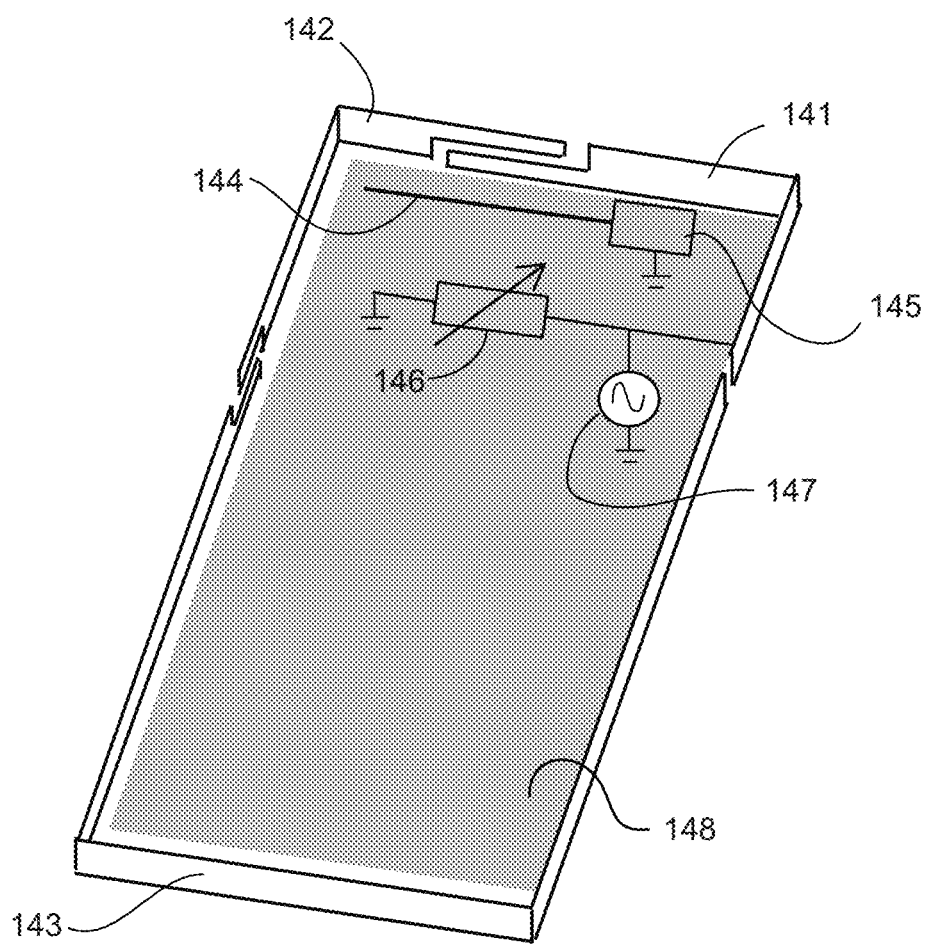
FIG. 14 shows an active beam steering antenna having tuning slots between conductors, the tuning slots provide an overlapping region of the conductors that is confined within the conductor plane.

FIG. 14 illustrates a beam steering antenna system wherein the conductor used to form the antenna is in a planar fashion. The conductors are cut to form an overlap region in the conductor plane. Here, the conductors are configured with slotted regions for creating an overlap. The length, thickness, and space between conductors can be configured for optimizing the performance of the antenna. The antenna comprises a first conductor 141, a second conductor 142, and a third conductor 143 extending about a periphery of the device circuit board 148. An active tunable component 146 is coupled to a feed 147 and tuning circuit, which is further coupled to the first conductor. An offset parasitic element 144 is coupled to a switch 145 which is further coupled to ground 148.

Figure 15:
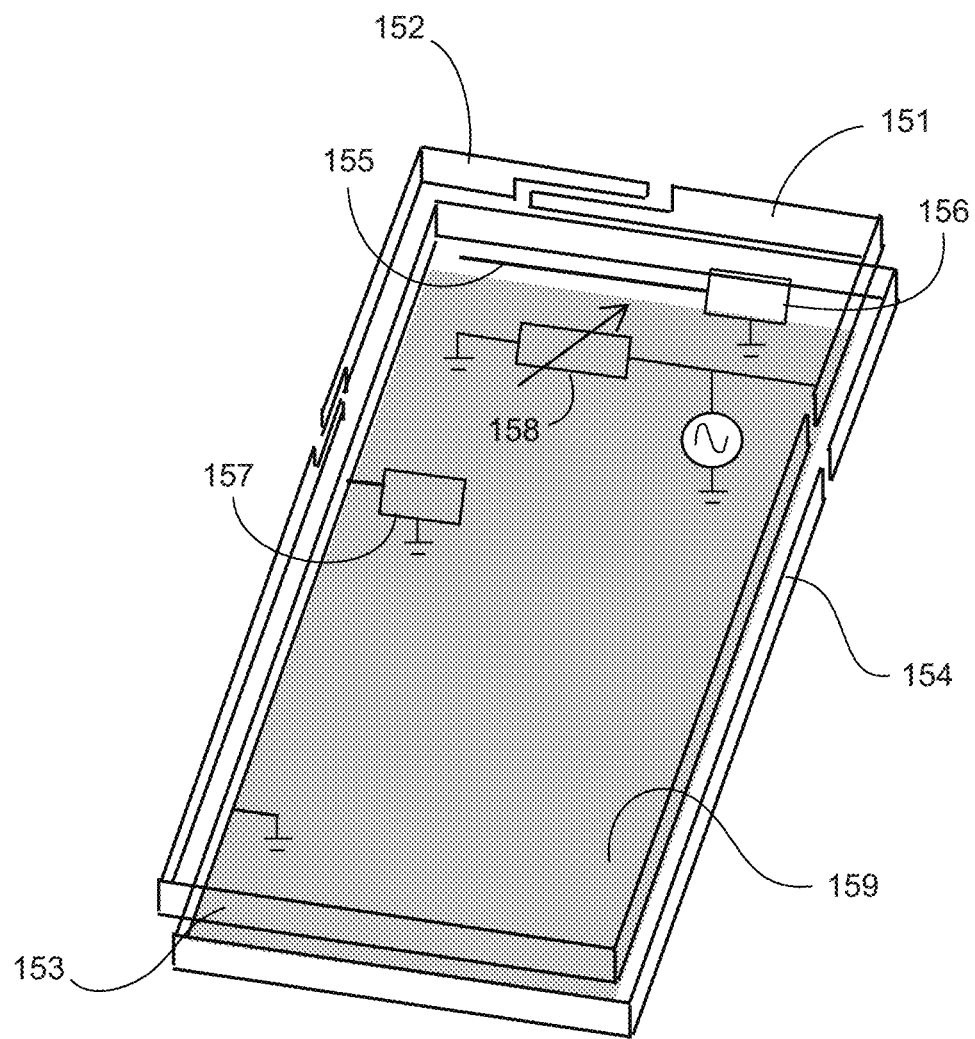
FIG. 15 shows an active beam steering antenna with stacked rings.

FIG. 15 illustrates a beam steering antenna system wherein two conductors are stacked to form a two conductor assembly. Both conductors are planar, with one conductor fed with an RF signal with this conductor forming the radiating element. The second conductor is positioned above the first conductor, with this second conductor containing a fixed ground point and a switch. The switch provides a method of dynamically grounding or un-grounding the second conductor to the common ground plane. Here, stacked rings are in planar alignment, a switch is coupled to the bottom ring to connect and disconnect the second ring from the ground plane. The antenna includes a first conductor 151, a second conductor 152 and a third conductor 153 extending about a periphery of the device forming a first ring. A second ring includes a fourth conductor 154. The first ring is positioned above the second ring about the periphery. A tuning and feed circuit is coupled to the first conductor with a tunable component 158 coupled therewith. An offset parasitic element 155 is coupled to a switch 156 which is further coupled to ground 159. A second switch 157 is used to couple and disconnect the second ring to the ground plane 159.

Figure 16:
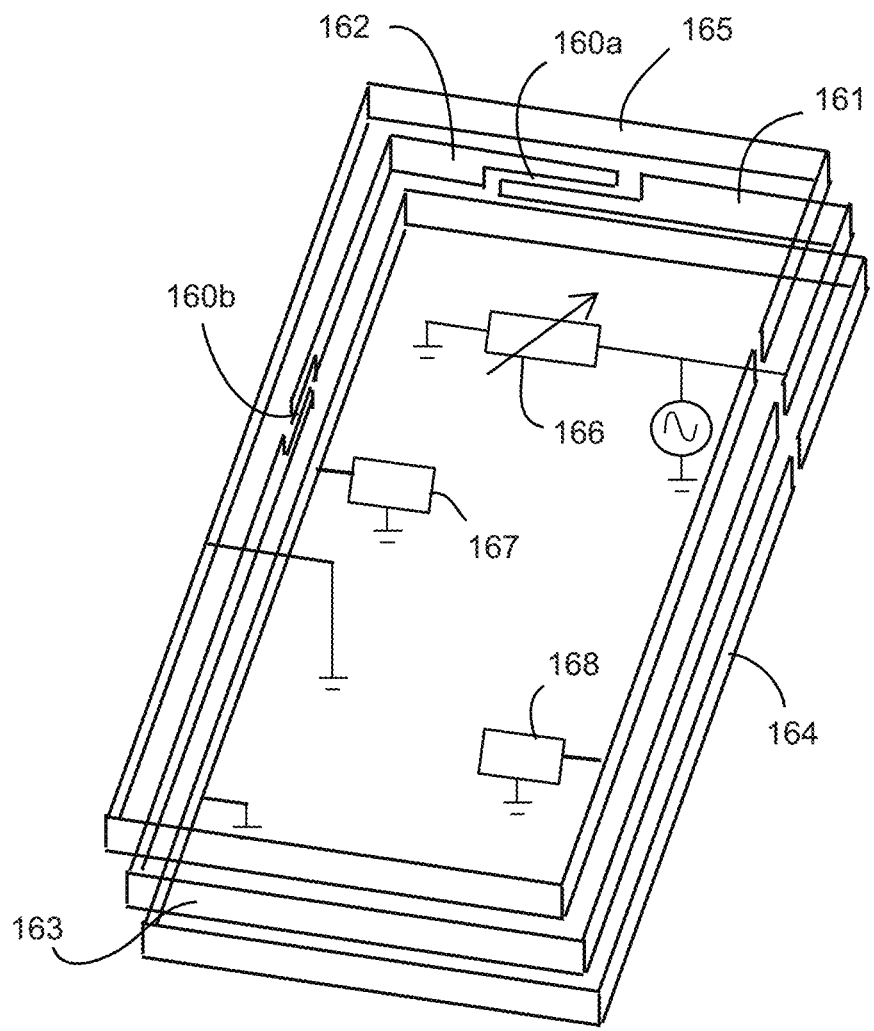
FIG. 16 shows another embodiment of an active beam steering antenna with stacked rings, the bottom and top rings can be grounded or ungrounded to alter the radiation mode of the antenna system.

FIG. 16 illustrates a beam steering antenna system wherein three rings are stacked to form a three ring assembly. All three rings are planar, with one conductor fed with an RF signal with this conductor forming the radiating element. The two additional rings are positioned above and below the first ring, with these additional two rings containing fixed ground points and switches 167; 168. The switches provide a method of dynamically grounding or un-grounding the two additional conductors to the common ground plane.

Figure 17:
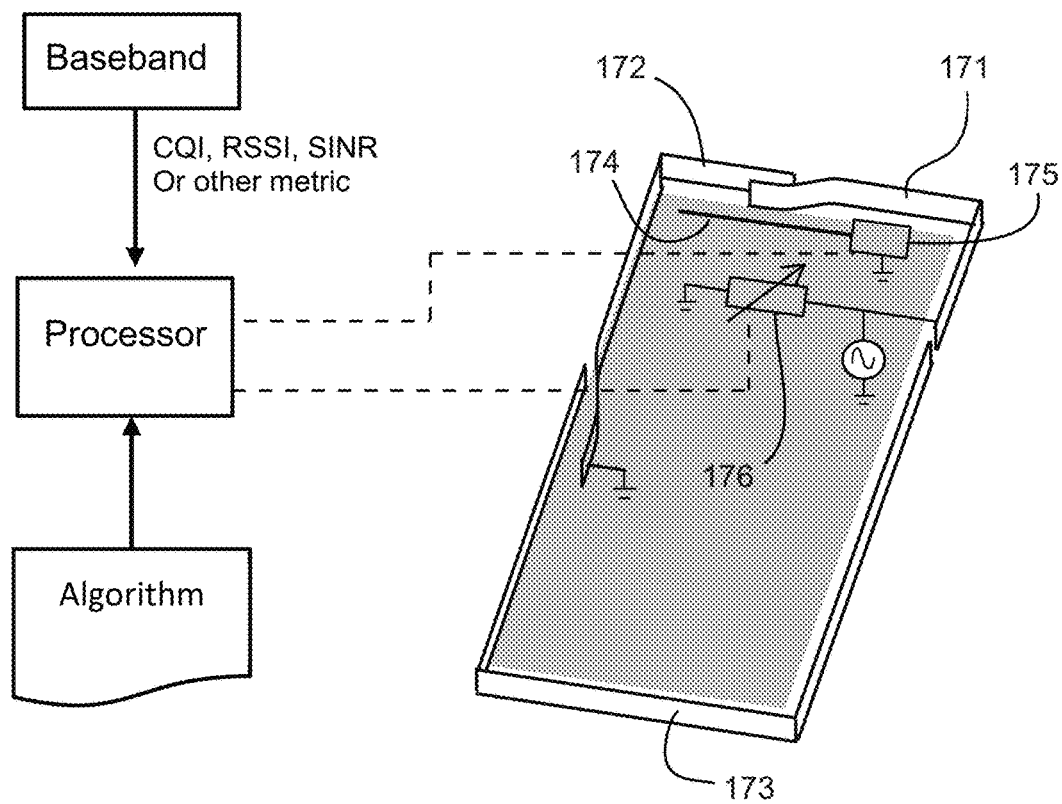
FIG. 17 shows a beam steering antenna system with an algorithm located in a processor, the algorithm accesses one or multiple metrics from the baseband of a communication system, the processor then implements a radiation mode selection process based upon one or multiple metrics from the baseband unit.

FIG. 17 illustrates a beam steering system along with an algorithm located in a processor. The algorithm accesses one or multiple metrics from the baseband of a communication system, with these metrics being Channel Quality Indicator (CQI), Receive Signal Strength Indicator (RSSI), Signal to Interference and Noise Ratio (SINR), or other metric. The algorithm in the processor implements a radiation mode selection process based upon one or multiple metrics from the baseband unit.

Figure 18:
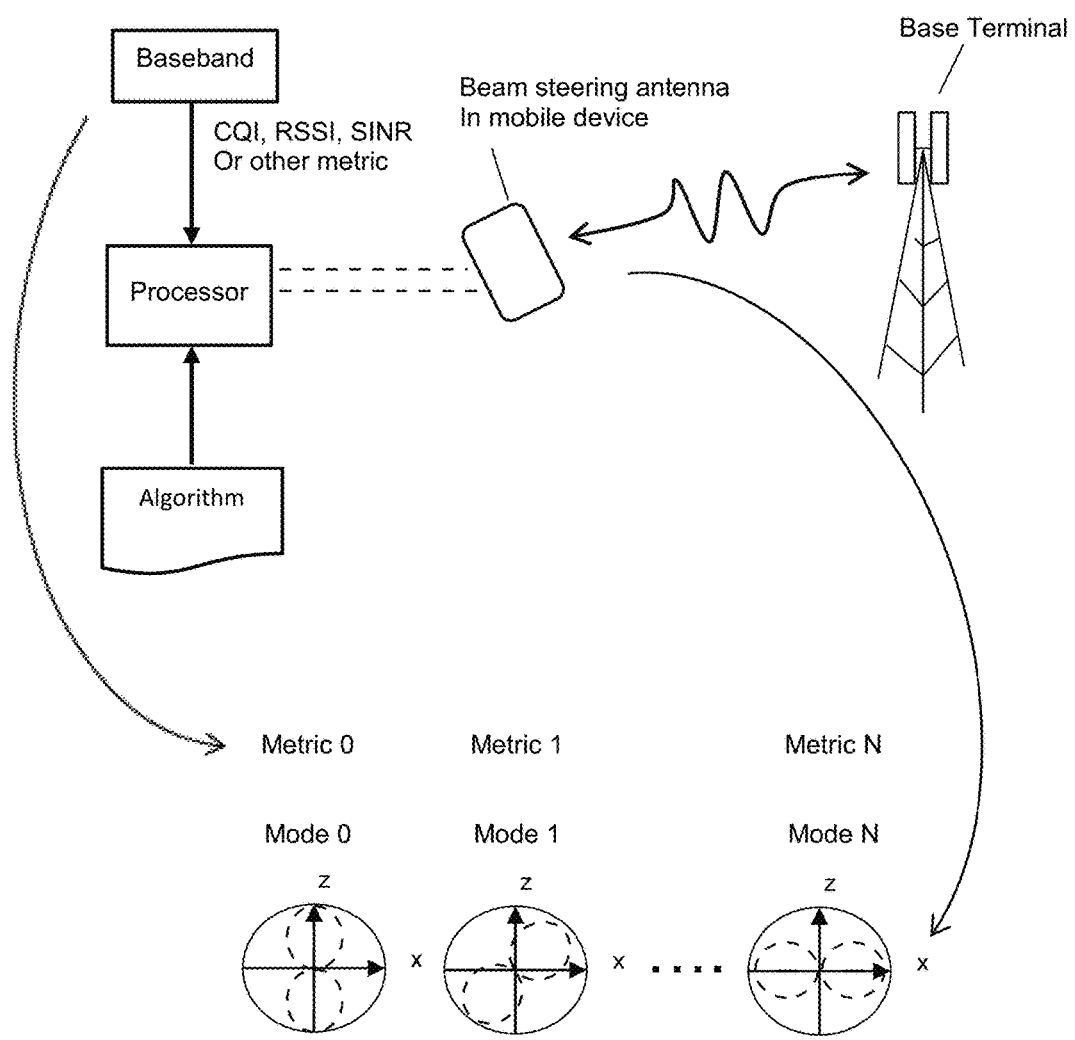
FIG. 18 describes the functional use of a beam steering system in a mobile device in a cellular network wherein N radiation modes can be sampled and chosen from to improve the communication link quality between the mobile communication device and the Base Terminal.

FIG. 18 describes the functional use of a beam steering system in a mobile device in a cellular network wherein N radiation modes can be sampled and chosen from to improve the communication link quality between the mobile communication device and the Base Terminal.

Figure 19:
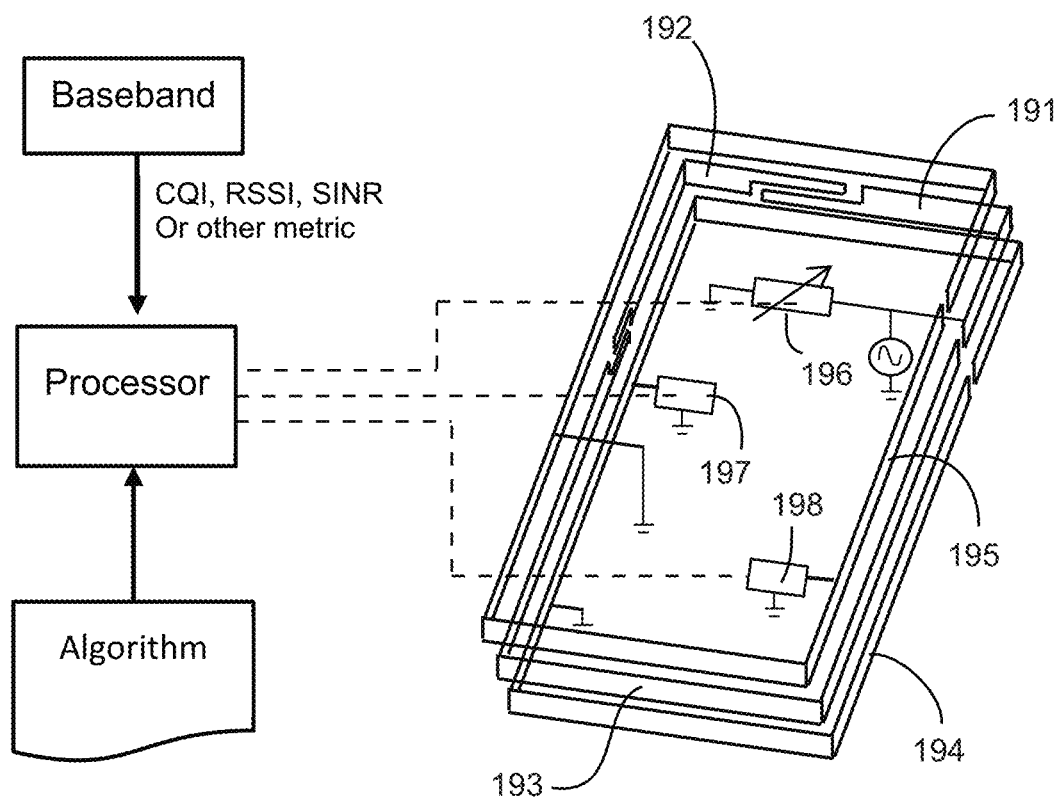
FIG. 19 shows a beam steering system and algorithm located in a processor, the algorithm accesses one or multiple metrics from the baseband of a communication system, the processor implements a radiation mode selection process based upon one or multiple metrics from the baseband unit, wherein control signals to drive the switches and tunable component are provided by the baseband/processor subsystem.

FIG. 19 illustrates a beam steering system along with an algorithm located in a processor. The algorithm accesses one or multiple metrics from the baseband of a communication system, with these metrics being Channel Quality Indicator (CQI), Receive Signal Strength Indicator (RSSI), Signal to Interference and Noise Ratio (SINR), or other metric. The algorithm in the processor implements a radiation mode selection process based upon one or multiple metrics from the baseband unit. Control signals to drive the switches and tunable component are provided by the Baseband/Processor sub-system.

What is claimed is:

1. In a wireless communication device, an antenna system comprising:

two or more conductors combined to extend about a periphery of the wireless communication device, said two or more conductors comprising at least a first conductor and a second conductor;

at least a first coupling region, wherein the second conductor is spaced apart from and configured to overlap with the first conductor to form the first coupling region therebetween;

a first parasitic element disposed adjacent to the first and second conductors at the first coupling region, the first parasitic element being coupled to ground; and an antenna feed coupled to the first conductor at a feed junction, the antenna feed being coupled to each of: an active tunable component and a tuning loop;

wherein the active tunable component is adjustable to vary a frequency response of the antenna.

2. The antenna system of claim 1, further comprising a second coupling region, wherein the second conductor is configured to overlap with and be spaced apart from the first conductor to form the second coupling region.

3. The antenna system of claim 2, wherein said first coupling region is disposed at a first side of the wireless communication device, and wherein said second coupling region is disposed at a second side of the wireless communication device opposite the first side.

4. In a wireless communication device, an antenna system comprising:

two or more conductors combined to extend about a periphery of the wireless communication device, said two or more conductors comprising at least a first conductor and a second conductor;

at least a first coupling region, wherein a first end of the second conductor is spaced apart from and configured to overlap with the first conductor to form the first coupling region therebetween;

a ground plane positioned within the periphery of the wireless communication device;

a first parasitic element disposed adjacent to the first and second conductors at the first coupling region; and an antenna feed coupled to the first conductor at a feed junction, wherein the first conductor is fed with a signal source at the antenna feed;

characterized in that:

the antenna system is configured to connect and disconnect the first parasitic element with the ground plane.

5. The antenna system of claim 4, wherein the first parasitic element is positioned above the ground plane and adjacent to the first coupling region.

6. The antenna system of claim 4, wherein a second end of the second conductor is coupled to the ground plane.

7. The antenna system of claim 4, further comprising a third conductor, wherein the first through third conductors combine to extend about the periphery of the wireless communication device.

8. The antenna system of claim 7, further comprising a second coupling region, wherein the second conductor is spaced apart from and configured to overlap with the third conductor to form the second coupling region therebetween.

9. The antenna system of claim 8, wherein a terminal end of the third conductor is positioned adjacent to a terminal end of the first conductor to form a gap therebetween.

10. The antenna system of claim 8, further comprising a first switch, wherein a first port of the first switch is coupled the first parasitic element and a second port of the first switch is coupled to the ground plane, the first switch configured to connect and disconnect the first parasitic element with the ground plane.

11. The antenna system of claim 10, further comprising a tunable component connected in shunt to the antenna feed; wherein the tunable component is configured to adjust a frequency response of the antenna system.

12. The antenna system of claim 11, wherein the first parasitic element is configured to produce a split resonance frequency response of the antenna system, rotate an antenna radiation pattern associated with the antenna system, or a combination thereof.

13. The antenna system of claim 11, wherein a state of the first switch, the tunable component, or a combination of the first switch and the tunable component, is configured via control signals received from a processor within the wireless communication device.

14. The antenna system of claim 10, further comprising a tunable component connected to the second conductor at the second coupling region; wherein the tunable component is configured to adjust a frequency response of the antenna system.

15. The antenna system of claim 14, wherein the first parasitic element comprises an L-shape conductor extending about a length and a depth, wherein each of the length and depth of the L-shape conductor is positioned adjacent to one or more conductors about the periphery of the wireless communication device.

16. The antenna system of claim 8, further comprising a fourth conductor, wherein the first through fourth conductors combine to extend about the periphery of the wireless communication device.

17. The antenna system of claim 16, wherein the third conductor is coupled to the ground plane at an end opposite the second coupling region.

18. The antenna system of claim 17, wherein at least one of the first and second parasitic elements comprises a planar conductor configured parallel with at least one of the first through fourth conductors extending about the periphery of the wireless communication device.

19. The antenna system of claim 17, wherein at least one of the first and second parasitic elements comprises a parasitic conductor including a length, wherein a portion of the parasitic conductor is bent in a u-shape and configured within said length for increasing the physical length of the parasitic conductor within a confined area.

20. The antenna system of claim 4, further comprising a second parasitic element and a second switch associated therewith, wherein a first port of the second switch is coupled the second parasitic element and a second port of the second switch is coupled to the ground plane, the second switch configured to connect and disconnect the second parasitic element with the ground plane.

21. The antenna system of claim 20, wherein the first parasitic element is dimensioned and positioned about the antenna system such that the first parasitic element is configured to vary a first resonant frequency of the antenna, and wherein the second parasitic element is dimensioned and positioned about the antenna system such that the second parasitic element is configured to vary a second resonant frequency of the antenna.

22. The antenna system of claim 20, wherein a state of the second switch is configured via control signals received from a processor within the wireless communication device.

23. The antenna system of claim 4, wherein the first and second conductors, and the first coupling region, are each confined within a common plane disposed about the periphery of the wireless communication device.

24. The antenna system of claim 4, further comprising two or more stacked conductors combined to extend about the periphery of the wireless communication device, wherein the two or more stacked conductors are positioned above the first and second conductors, and wherein the two or more stacked conductors are selectively coupled to the ground plane via a third switch disposed therebetween.

25. The antenna system of claim 24, further comprising three or more conductor rings stacked above the ground plane, wherein each of the three or more conductor rings is configured to extend about the periphery of the wireless communication device.

26. The antenna system of claim 24, wherein a state of the third switch is configured via control signals received from a processor within the wireless communication device.

* * * * *